(12) United States Patent
BuAbbud

(10) Patent No.: US 12,003,317 B2
(45) Date of Patent: Jun. 4, 2024

(54) BIDIRECTIONAL SINGLE-FIBER COHERENT TRANSMISSION SYSTEM

(71) Applicant: Lumentum Operations LLC, San Jose, CA (US)

(72) Inventor: George BuAbbud, Shrewsbury, MA (US)

(73) Assignee: Lumentum Operations LLC, San Jose, CA (US)

(*) Notice: Subject to any disclaimer, the term of this patent is extended or adjusted under 35 U.S.C. 154(b) by 14 days.

(21) Appl. No.: 17/781,513

(22) PCT Filed: Dec. 7, 2020

(86) PCT No.: PCT/US2020/063529
§ 371 (c)(1),
(2) Date: Jun. 1, 2022

(87) PCT Pub. No.: WO2021/113793
PCT Pub. Date: Jun. 10, 2021

(65) Prior Publication Data
US 2023/0006758 A1   Jan. 5, 2023

Related U.S. Application Data

(60) Provisional application No. 62/944,000, filed on Dec. 5, 2019.

(51) Int. Cl.
*H04J 14/02* (2006.01)
(52) U.S. Cl.
CPC ................. *H04J 14/0227* (2013.01)
(58) Field of Classification Search
CPC ................................. H04J 14/0227
(Continued)

(56) References Cited

U.S. PATENT DOCUMENTS 10,892,829 B2 *  1/2021  Jia ..................... H04B 10/25
11,025,344 B2 *  6/2021  Jia ..................... H04B 10/63
(Continued)

FOREIGN PATENT DOCUMENTS

EP   2180614 A1   4/2010
EP   2313997 A1   4/2011
(Continued)

OTHER PUBLICATIONS

Acacia ;Coherent BiDi for Edge and Access Network Applications; Oct. 2020; Acacia communications Inc; pp. 1-8. (Year: 2020).*
(Continued)

*Primary Examiner* — Amritbir K Sandhu
(74) *Attorney, Agent, or Firm* — Harrity & Harrity, LLP

(57) ABSTRACT

The Bi-Di coherent transmission system is configured with at least one pair of modules coupled to one another via a single fiber. The modules each are configured with a pair of laser outputting two reference signals at respective different wavelengths $\lambda_{1o}$ and $\lambda_{2o}$, photonic transceiver and a wavelength division multiplexer (WDM) coupler. The photonic transceivers each have transmitter and receiver branches integrated in a photonic circuit and receiving the reference signals. The transmitter is configured to modulate the received reference signals $\lambda_{1o}T$ and $\lambda_{2o}T$ which are further coupled into the WDM coupler. The WDM couplers each sort out one of the modulated signals and transmit the other modulated signal such that the transmitted modulated signal at different wavelengths $\lambda_{1o}T$ and $\lambda_{2o}T$ are coupled into respective opposite ends of the fiber and propagate towards one another in opposite directions. The transmitted modulated signals are coupled into respective branches through the WDM couplers with each transmitted modulated signal interfering with the reference signals at wavelengths $\lambda_{1o}$ and $\lambda_{2o}$. The photodiodes of respective receiving branches are (Continued)

configured to detect a beat frequency of the interfering signals at the same wavelength.

20 Claims, 2 Drawing Sheets

(58) Field of Classification Search
USPC .......................................................... 398/82
See application file for complete search history.

(56) References Cited

U.S. PATENT DOCUMENTS

| | | | | |
|---|---|---|---|---|
| 2010/0278535 | A1* | 11/2010 | Kim | H04J 14/0282 398/72 |
| 2012/0033688 | A1* | 2/2012 | Liaw | H01S 3/08036 372/20 |
| 2012/0269514 | A1* | 10/2012 | Nedovic | H04B 10/801 398/66 |
| 2013/0209020 | A1* | 8/2013 | Doerr | G02F 1/2257 385/2 |
| 2019/0158211 | A1* | 5/2019 | Fürst | H04Q 11/0005 |
| 2019/0181952 | A1 | 6/2019 | Jia et al. | |
| 2022/0204258 | A1* | 6/2022 | Yang | A01N 59/16 |

FOREIGN PATENT DOCUMENTS

| | | |
|---|---|---|
| EP | 3487091 A1 | 5/2019 |
| RU | 2279112 C2 | 6/2006 |
| WO | 03034111 A2 | 4/2003 |
| WO | 2012087194 A1 | 6/2012 |

OTHER PUBLICATIONS

Zhou et al; Coherent Interference Reduction in Single-Fiber Bidirectional System for 100 Gb/s Short Distance Applications ; 2016; IEEE; pp. 1-3. (Year: 2016).*
International Search Report and Written Opinion for Application No. PCT/US2020/063529, dated Mar. 18, 2021, 6 pages.
Extended European Search Report for Application No. EP20200895640, dated Dec. 6, 2023, 10 Pages.
Kazovsky, L.G., et al., "Next-Generation Optical Access Networks," Journal of Lightwave Technology, Nov. 2007, vol. 25(11), pp. 3428-3442.

* cited by examiner

BIDIRECTIONAL SINGLE-FIBER COHERENT TRANSMISSION SYSTEM

BACKGROUND OF THE DISCLOSURE

Field of the Disclosure

The disclosure relates generally to optical communications systems, and more particularly to bidirectional coherent transmission of optical signals via a single optical fiber.

Background of the Disclosure

Various fiber optic communication systems have been developed for conveying information bidirectionally or reciprocally, i.e. symmetrically with respect to the direction of propagation, between first and second locations. There are two fundamental topologies to achieve bidirectional coherent transport: dual-fiber and single-fiber. The dual fiber configuration requiring two strands of fibers—one for transmission and one for receiving signals at the same or different wavelengths—has been a long-time established industrial standard.

The main motivation for considering bidirectional transmission over a single optical fiber instead of two unidirectional fibers is the reduction of the infrastructure (fibers, optical splitters and optical amplifiers) by a factor two and the potential cost reduction by an integrated transceiver design. Also, a single fiber configuration is less susceptible to connection errors because there are fewer connections or end points in the network. In addition, customer can also choose to use single fiber to decrease redundancy in the network.

In recent years, the mainstream single-fiber transmission technology is based on two different wavelengths traveling in opposite directions (BiDi transmission) which doubles the fiber capacity. The key to this technology is wavelength division multiplexing/de-multiplexing (BiDi WDM) couplers, also known as diplexers, which combine and separate data transmitted over a single fiber based on the wavelengths of the light. Generally, this WDM coupler is integrated into a standard interface photonic optical transceiver module. The WDM however is a sophisticated and thus expensive device.

FIG. 1 illustrates a bidirectional transmission system using a single optical fiber to send data in both directions Tx, Rx. Two BiDi WDM transceivers each are used to combine and separate wavelengths. If, for example, one of BiDi WDM transceivers has a receiving wavelength of 1550 nm and a transmit wavelength of 1310 nm, then it is necessary to use its matching module which has a receiving wavelength of 1310 nm and a transmit wavelength of 1550 nm. As a consequence, the capacity of the single fiber is twice the capacity of the two fiber system. But does it meet the necessary requirements imposed by a modern web-scale world? On-demand content, bandwidth-hungry mobile apps, high-definition video streaming, and new cloud-based IT applications are driving massive scale and unpredictable traffic patterns. Network capacities are increasing by 25 to 50 percent every year, and current systems just cannot keep up with this rapid scalability.

Coherent optics at least partially addresses the capacity problems network providers are facing. It takes the typical ones and zeroes in a digital signal—the blinking on and off of the light in the fiber—and uses sophisticated technology to modulate the amplitude and phase of that light and send the signal across each of two polarizations. This, in turn, imparts considerably more information onto the light propagating through a fiber optic cable. Thus the BiDi WDM coherent detection is associated with at least: 1. high order amplitude/phase modulation; 2. polarization multiplexing; 3. coherent detection using a local oscillator in the receiver; and 4. high-speed analog-digital converters (ADCs) and sophisticated digital signal processing in the receiver.

There are very few practical implementations of coherent technologies on the market today. Mainly it can be explained by the complexity of these systems requiring an unusual mixture of optical, digital and radio modem experience, which is coupled with a very demanding optical transmitter and receiver circuit design.

A need therefore exists for a cost-effective bidirectional single-fiber coherent transmission system.

SUMMARY OF THE DISCLOSURE

The disclosed cost-effective Bi-Di single-fiber coherent transmission system increases the fiber capacity by providing two single frequency (SF) continuous wave (CW) lasers operating at respective, different wavelengths $\lambda_{1o}$ and $\lambda_{2o}$ in each of the modules. Due to WDM technology, only signals at respective different wavelengths are simultaneously guided through a single fiber in opposite directions providing the interference-free transmission of these signals between two modules.

The modules of the disclosed bidirectional coherent system have the same configuration and include respective photonic Bi-Di WDM transceivers. The transceivers each are integrated in a silicon photonic chip, which is configured with optoelectronic devices on a photonically-enabled integrated circuit (PIC), and include signal transmitting and signal receiving branches. The transmitting branch is configured with one or multiple phase and polarization optical modulators, whereas the receiving branch has a photodiode (PD). In accordance with one feature of the disclosure, the lasers of each module generate respective reference signals at different wavelengths $\lambda_{1o}$ and $\lambda_{2o}$ both of which are coupled into the transmitting and receiving branches of respective transceivers.

The signal transmitting branches each are configured with one or more modulators receiving reference signals $\lambda_{1o}$ and $\lambda_{2o}$ and modulating them so as to output respective modulated signals $\lambda_{1o}T$ and $\lambda_{2o}T$. In the disclosed schematic, the phase and polarization, are utilized to carry the data in opposite directions between the transceivers.

The Bi-Di transceivers are fitted with Wavelength Division Multiplexing (WDM) couplers which, in general, combine and separate data transmitted over a single fiber based on the wavelengths of the light. In particular, the WDMs each receive modulated signals at respective wavelengths $\lambda_{1o}T$ and $\lambda_{2o}T$ and sort out one of them such that only modulated signals at respective different wavelengths $\lambda_{1o}T$ and $\lambda_{2o}T$ are transmitted in opposite directions through the single fiber linking the WDM couplers.

The transmitted modulated signals are received by respective WDMs of the transceivers which guide the received modulated signals to respective receiving branches. As known, a PD cannot directly detect the phase coding. To provide the decoding of the received data in the disclosed system each of the transmitted modulated signals interferes with both reference signals $\lambda_{1o}$ and $\lambda_{2o}$ which results in two beat frequencies.

In accordance with one of salient features of the disclosure, only the beating of reference and modulated signals having the same wavelength provide the phase information that will be converted from the optical domain to the electrical domain by a PD in each of the receiving branches. The beat frequency generated by the interference of reference and modulated signals at respective different wavelengths lies outside the responsivity range of the PD and is practically undetectable by the PD. As known, the responsivity of a PD beyond a 0-45 GHz frequency range drops sharply. Thus, when the reference signal at wavelength $\lambda_{2o}$ in one of the transceivers interferes with modulated signal $\lambda_{1o}T$ and reference signal $\lambda_{1o}$ and modulated signal $\lambda_{2o}T$ beat against each other in the other transceiver, the respective resulting beat frequencies each lie in a spectral range outside the detection bandwidth of the PD. As a result, the disclosed PDs each function as a spectral filter.

Other features of the disclosed system include a few structural additions to the above disclosed inventive concept. Thus, for instance, WDM couplers may be integrated in respective PICs or may be pigtailed. The same modification relates to each pair of laser diodes which are this may be pigtailed or fully integrated in the PIC. The modules each can include additional photonic devices well known to one of ordinary skill in the telecommunication art and typically integrated in the PIC.

BRIEF DESCRIPTION OF THE DRAWINGS

The above and additional features of the disclosed structure will be discussed in detail below and illustrated by the following drawings, in which.

SPECIFIC STRUCTURE

Disclosed herein are architectures for a bidirectional coherent transmission system based on the use of photonic devices. The disclosed architectures offer several advantages including, among others, a high transmission capacity fiber and simple cost efficient configuration.

Figure 1:
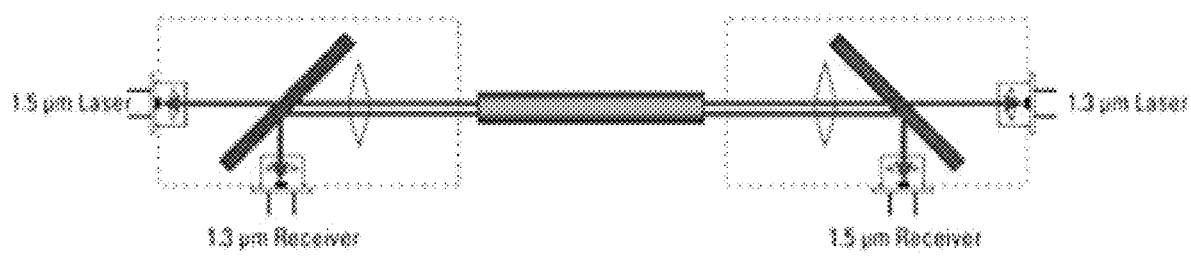
FIG. 1 is a simplified optical schematic of the known single fiber bidirectional communication system.
Figure 2:
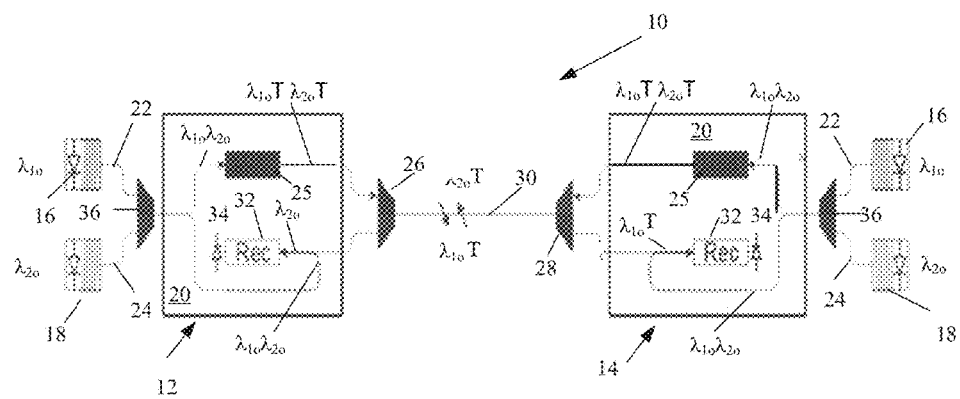
FIG. 2 is the inventive schematic including two terminals or modules.

Referring to FIG. 2, disclosed system 10 thus includes at least one pair of spaced apart modules 12, 14 in optical communication with one another. The modules 12, 14 each include a pair of SF diode lasers 16, 18 packaged with a PIC 20. The SF diode lasers 16, 18 each are pigtailed, i.e., the optical connection between the SF lasers and PIC 20 is realized by respective single mode (SM) fibers 22, 24 both coupled into a 50-50 coupler 36. Alternatively, the SF lasers may be integrated in PIC, 20. Each module is configured to send/receive modulated signals at respective different wavelengths $\lambda_{1o}$ and $\lambda_{2o}$ and compound them to one optical fiber without interference by using WDM technology. In the latter, communications flow continuously in one direction at one wavelength and simultaneously in the other direction at the other wavelength.

The PICs 20 each have integrated high speed phase modulator 25 operative to modulate the phase of reference signals at respective wavelengths $\lambda_{1o}$ and $\lambda_{2o}$ and output respective modulated signals $\lambda_{1o}T$ and $\lambda_{2o}T$ which further propagate through a bidirectional WDM 26, 28 wherein one of the modulated signals is filtered out. The remaining modulated signal high $\lambda_{1o}T$ transmitted by modulator 25 of module 12 and modulated signal high $\lambda_{2o}T$ transmitted by other modulator 25 of module 14 are coupled into respective ends of a SM fiber 30 and guided in the opposite directions. The transmitted modulated signals $\lambda_{1o}T$, $\lambda_{2o}T$ are coupled into respective WDM couplers 28, 26 which further transmit these signals to respective receivers 32 of modules 14, 12.

It is well known that the phase coding on the light-wave cannot be detected directly by the photodetector (PD) of the receiving branch. Therefore, when the received modulated signal, for example $\lambda_{1o}T$, beats against reference signals $\lambda_{1o}$ and $\lambda_{2o}$ in the receiving branch 32 of module 14, only one beat frequency, which is generated by beating the reference and modulated signals at the same wavelength $\lambda_{1o}$, is detected by PD 34. The other beat frequency produced as a result of interference between modulated signal $\lambda_{1o}T$ and reference signal $\lambda_{2o}$—signals at different wavelengths—is beyond the detection range of PD 34. Similarly, PD 34 integrated in other module 12 detects the beat frequency between transported modulated signal at $\lambda_{2o}T$ and reference signal at the same wavelength $\lambda_{2o}$, while the interference between the signals at different wavelengths produces a weak constant current amounting to insignificant background noise. The signals detected by respective PDs 34 are further processed in a digital signal processor (DSP), as customary in the art of communication.

Figure 3:
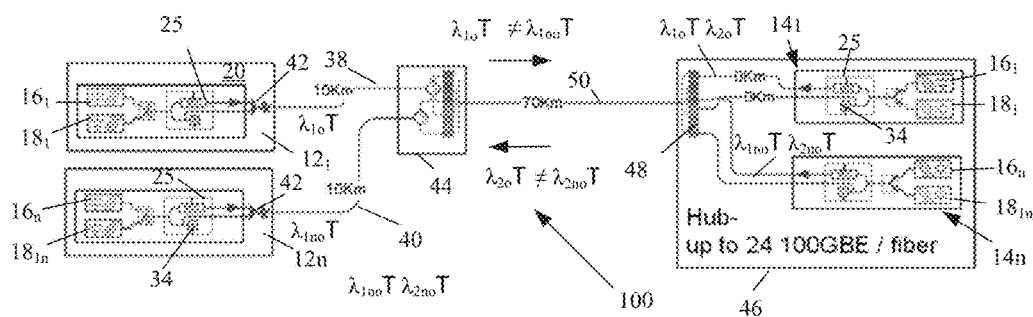
FIG. 3 is the schematic of the disclosed structure of FIG. 2 illustrating a multi-terminal-hub communication system.

FIG. 3 illustrates inventive system 100 transmitting data between a plurality of individual spaced modules $12_1 \ldots 12n$ and a hub 46 having respective adjacent modules $14_1 \ldots 14n$ which are paired with respective modules $12_1$-$12n$. As a result, modules $12_1 \ldots 12n$ and modules $14_1 \ldots 14n$ form respective two clusters of modules.

The modules $12_2 \ldots 12n$ each have the configuration identical to the configuration of module 12 of FIG. 2. Thus each of modules $12_1 \ldots 12n$ includes a pair of SF lasers $16_1$, $18_1 \ldots 16_n$, $18_n$, PIC 20 with integrated modulator 25 and receiver 32, WDM 42, and PD 34. The lasers output respective reference signals at wavelengths $\lambda_{1o}$-$\lambda_{1no} \ldots \lambda_{2o}$-$\lambda_{2no}$ which are all different from one another. Thus, reference signals at respective wavelengths $\lambda_{1o}$ and $\lambda_{2o}$, ($\lambda_{1no}$ and $\lambda_{2no}$) of each individual module 12 differ from each other, and reference signals at respective wavelengths $\lambda_{1o}$ and $\lambda_{1no}$ (and $\lambda_{2no}$ and $\lambda_{2o}$) of modules $12_1$ and $12n$ also differ from one another. After filtering modulated signals at respective wavelengths $\lambda_{2o}T$ and $\lambda_{2no}T$ by respective WDMs 42, the remaining modulated signals $\lambda_{1o}T$ and $\lambda_{1no}T$ of respective modules $12_1$-$12n$ are guided through respective channels of an output WDM 44, which is coupled to all individual WDMS 25. The transmitted modulated signals further propagate in a single SM fiber 50 towards WDM 48 of hub 46 which further transmits these signals to respective receiving branches 34 of modules $14_1 \ldots 14n$ via individual WDMs 42. The number of modules and channels of WDM 44 are limited only by practical considerations.

The WDM 48 is a single WDM in hub 46, i.e., individual modules $14_1 \ldots 14n$ don't have respective WDMs which can be explained by limited space of hub 46 and close proximity of modules 14 to WDM 48. In contrast, WDMs 25 of respective modules 12 can be spaced from output WDM 44 at tens of kilometers. Returning to WDM 48, it is easy to see that this WDM is common to all modules $14_1$-$14n$ of hub 46. Functionally, upon filtering output modulated signals at respective wavelengths $\lambda_{1o}$-$\lambda_{1no}$, common WDM 48 transmits modulated signals at respective wavelengths $\lambda_{2o}$-$\lambda_{2no}$ to output WDM 44 via fiber 50 in the direction opposite to that of signals $\lambda_{1o}T \ldots \lambda_{1no}T$. Decoding of the received modulated signals is done by respective DSPs in the manner disclosed above.

Figure 4:
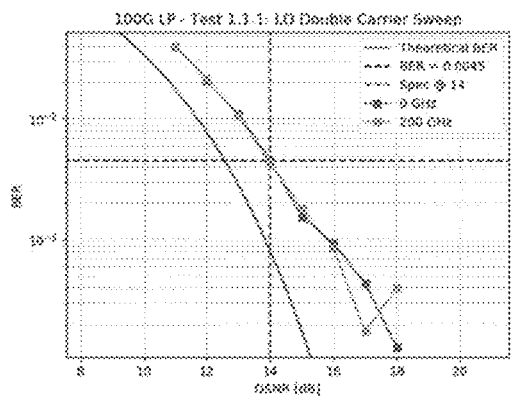
FIG. 4 illustrates the results of optical signal to noise ratio (OSNR) vs. bit error rate (BER) observed in an experimental system configured in accordance with the present disclosure.
Figure 5:
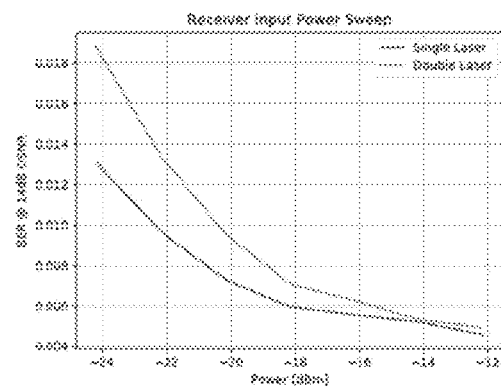
FIG. 5 illustrates the sensitivity test of the experimental system of FIG. 4.

The inventive system 10 of FIG. 2 was tested to investigate the system's penalty including optical signal to noise ratio (OSNR) and sensibility of 1000 signal as compared to an analogous two fiber communication system. The simulation parameters of the tested system include a 100 G transmission rate, 500 km transmission distance, 13 dbm power of lasers, 200 ghz lasers frequency separation, frequency offset (tested channel)—1.8 GHz. FIG. 4 illustrates the bit error rate as a function of the OSNR. As can be seen from the figure no degradation was observed. FIG. 5 illustrates the results of the sensibility test. As shown at OSNR of 14 dB a 2 dB penalty was observed.

It is to be appreciated that various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

The invention claimed is:

1. A bidirectional (BiDi) coherent transmission system comprising:
   at least one pair of spaced modules each configured with:
      two lasers outputting respective reference signals at different wavelengths $\lambda_{1o}$ and $\lambda_{2o}$,
      a photonic transceiver including transmitting and receiving branches which both receive the reference signals, the transmitting branches of respective transceivers each being configured to output respective modulated signals $\lambda_{1o}T$ and $\lambda_{2o}T$,
      a Bi-Di wavelength division multiplexer (WDM) coupler receiving modulated signals $\lambda_{1o}T$ and $\lambda_{2o}T$ and sorting out one of them, so that only modulated signals at respective different wavelengths $\lambda_{1o}T$ and $\lambda_{2o}T$ are transmitted by respective WDMs, and
   a single fiber guiding transmitted modulated signals $\lambda_{1o}T$ and $\lambda_{2o}T$ in respective directions opposite to one another towards respective receiving branches which each have a photodiode (PD), the transmitted modulated signals each interfering with the reference signals at respective wavelengths $\lambda_{1o}$ and $\lambda_{2o}$ such that each PD detects a beat frequency of the reference and transmitted modulated signals at the same wavelength but is not responsive to a beat frequency of the reference and transmitted modulated signals at respective different wavelengths.

2. The Bi-Di coherent transmission system of claim 1, wherein the transceivers each are integrated in a photonic integrated circuit (PIC).

3. The Bi-Di coherent transmission system of claim 2, wherein the lasers each are integrated in respective PICs or are pigtailed.

4. The Bi-Di coherent transmission system of claim 3, wherein the lasers each are a single frequency diode laser or single frequency fiber laser.

5. The Bi-Di coherent transmission system of claim 3 further comprising a pair of couplers each located between the pigtailed lasers and transceiver and configured to split an output of the lasers between the transmitting and receiving branches of each PIC.

6. The Bi-Di coherent transmission system of claim 2, wherein the transmitting branches each are configured with one or more phase modulators integrated in the PIC.

7. The Bi-Di coherent transmission system of claim 2, wherein the WDM couplers each are integrated in the PIC or pigtailed.

8. The Bi-Di coherent transmission system of claim 1, wherein the fiber is a single transverse mode fiber.

9. The Bi-Di coherent transmission system of claim 1, further comprising a plurality of additional modules grouped in one and other clusters such that each module of one cluster is paired with a corresponding module of the other cluster to form a plurality of pairs of modules.

10. The Bi-Di coherent transmission system of claim 9, wherein the modules of the other cluster are located in a hub and optically coupled to the WDM which is common to the modules of the hub, the modules of the one cluster having respective WDMs which are optically coupled to an output WDM, the output WDM and WDM common to the modules of the other cluster being coupled to respective opposite ends of the single fiber.

11. The Bi-Di coherent transmission system of claim 10, wherein the lasers of each pair of the modules output different reference signals at respective wavelengths which differ from wavelengths of respective reference signals of all other pairs.

12. The Bi-Di coherent transmission system of claim 9, wherein the output WDM and WDM of the other cluster each have a multichannel configuration.

13. A bidirectional (BiDi) coherent transmission module comprising:
   two lasers outputting respective reference signals at different wavelengths $\lambda_{1o}$ and $\lambda_{2o}$;
   a photonic transceiver including a transmitting branch and a receiving branch,
      wherein both the transmitting branch and the receiving branch are configured to receive the reference signals,
      wherein the receiving branch comprises a photodiode (PD), and
      wherein the transmitting branch is configured to output the modulated reference signals, including modulated signal $\lambda_{1o}T$ and modulated signal $\lambda_{2o}T$;
   a Bi-Di wavelength division multiplexer (WDM) coupler configured to receive the modulated reference signals and filter the modulated reference signals so that only one of the modulated reference signals, modulated signal $\lambda_{1o}T$ or modulated signal $\lambda_{2o}T$, is transmitted by the WDM; and
   a single fiber configured to guide a transmitted modulated signal from the WDM in a direction opposite to another transmitted modulated signal, such that the other transmitted modulated signal interferes with the reference signals at wavelengths $\lambda_{1o}$ or $\lambda_{2o}$,
      wherein the PD is configured to detect a beat frequency of the reference signal and the other transmitted modulated signal at a same wavelength but is not responsive to a beat frequency of the reference signal and the other transmitted modulated signal at different wavelengths.

14. The Bi-Di coherent transmission module of claim 13, wherein the transceiver is integrated in a photonic integrated circuit (PIC).

15. The Bi-Di coherent transmission module of claim 14, wherein the lasers are integrated in the PIC or are pigtailed.

16. The Bi-Di coherent transmission module of claim 15, wherein the lasers are single frequency diode lasers or single frequency fiber lasers.

17. The Bi-Di coherent transmission module of claim 15, further comprising a coupler located between the pigtailed lasers and the transceiver and configured to split an output of the lasers between the transmitting branch and the receiving branch.

18. The Bi-Di coherent transmission module of claim 14, wherein the transmitting branch is configured with one or more phase modulators integrated in the PIC.

19. The Bi-Di coherent transmission module of claim 14, wherein the WDM coupler is integrated in the PIC or pigtailed.

20. The Bi-Di coherent transmission module of claim 13, wherein the fiber is a single transverse mode fiber.

* * * * *